: 3,071,693
GENERATION CONTROL SYSTEM
Frederick Beam Davis 3rd, Drexel Hill, Pa., assignor to
 Leeds and Northrup Company, Philadelphia, Pa., a
 corporation of Pennsylvania
Filed May 3, 1961, Ser. No. 107,581
18 Claims. (Cl. 307—53)

This invention relates to control of the generation of power for an interconnected area made up of a plurality of generating stations and has for an object the provision of a function generator for producing outputs respectively representative of desired generation of each station in accordance with selected corresponding portions of the several loading curves of the generating stations.

In accordance with the present invention, advantage is taken of the fact that the loading curves for the respective generating stations may be approximated by a plurality of straight-line segments, some of which have slopes differing from the others. The several loading curves have breakpoints (where a straight-line segment meets a second straight-line segment) which occur at selected and corresponding values of the total generation requirements of the generating area. By providing means for generating a plurality of signals, each corresponding respectively in magnitude with the desired values of generation of each station at corresponding breakpoints, together with an additional means for generating a signal representative of the generation requirements of the area, there may be obtained from a computer jointly responsive to the aforesaid signals outputs representative of the generation needed to meet the total requirements of the area and yet respectively representative of the desired generation of each said station as determined by the individual straight-line segments between adjacent breakpoints.

Further in accordance with the invention, there are provided means responsive to the total controlled-generation requirements of the interconnected area for establishing operation of the computing means first in accordance with the individual straight-line segments between a first pair of adjacent breakpoints and then between a different adjacent pair of breakpoints and as required by the magnitude of the total generation requirements.

By reason of the foregoing provisions, each of the plurality of output signals is representative of the desired generation of a station which stations together meet the total generation requirements of the area. This means that in terms of the operation of the system as a whole, operators have at hand outputs which, as appearing on instruments or as applied to control systems, may be calibrated in terms of generation, thus providing a simple, reliable system with minimum demand on the part of the operator to achieve optimized operation of the several generating stations.

For a more comprehensive understanding of the present invention together with its underlying theory and for further objects and advantages, reference is to be had to the following description taken in conjunction with the accompanying drawings, in which:

FIG. 1 diagrammatically illustrates a simplified embodiment of the invention;

Figure 1:
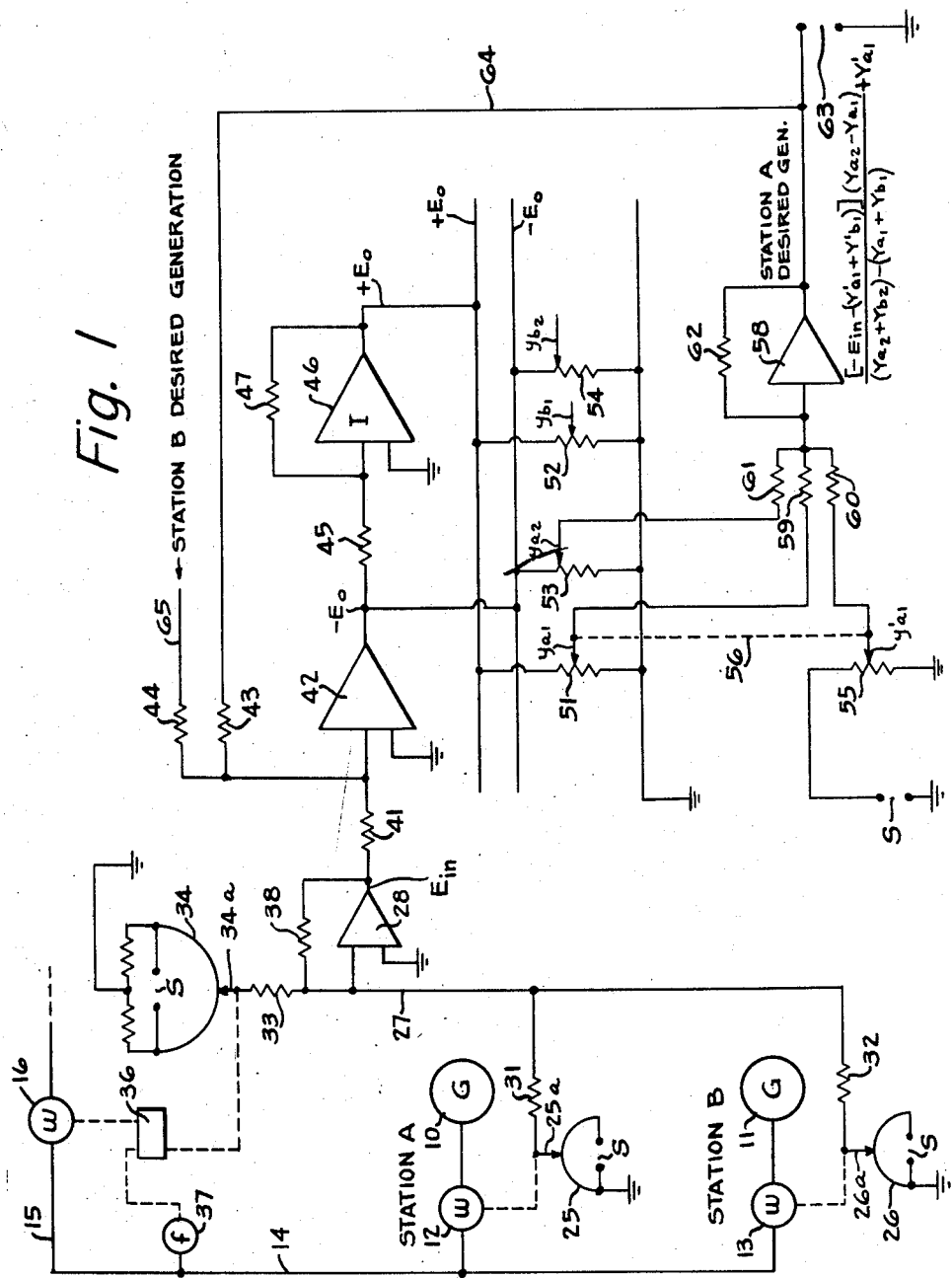

Referring now to the drawings, the invention in simplified form has been shown in FIG. 1 as comprising a system for the control of generation of a plurality of generating stations of an interconnected area or network of which only the generators 10 and 11 of Stations A and B have been illustrated.

In the accompanying drawings, Stations A and B have been illustrated as adjacent each other and sufficiently close that a single conductor 27 may have applied thereto outputs from potentiometers 25 and 26. In practice, it will be understood that the stations will be widely separated and that the computing system later to be described may be located at the load dispatcher's office which may or may not coincide with the location of a station. The telemetering connections between stations and the load dispatcher's office are well understood by those skilled in the art and include means for reproducing at the load dispatcher's office the outputs from the potentiometers, together with means for sending to the stations signals for producing desired generation by the stations.

These generators 10 and 11 are respectively connected through wattmeters 12 and 13 to a transmission line 14 which, in turn, is connected to a tieline 15 which, through a wattmeter 16, extends to the other areas likewise including a plurality of interconnected generating stations. As well understood by those skilled in the art, each station will include one or more generators, and the station characteristic curve representing the proportion of the total area-generation requirements to be shared by a station may be represented by a curve approximated by a plurality of interconnected straight lines.

Figure 2:
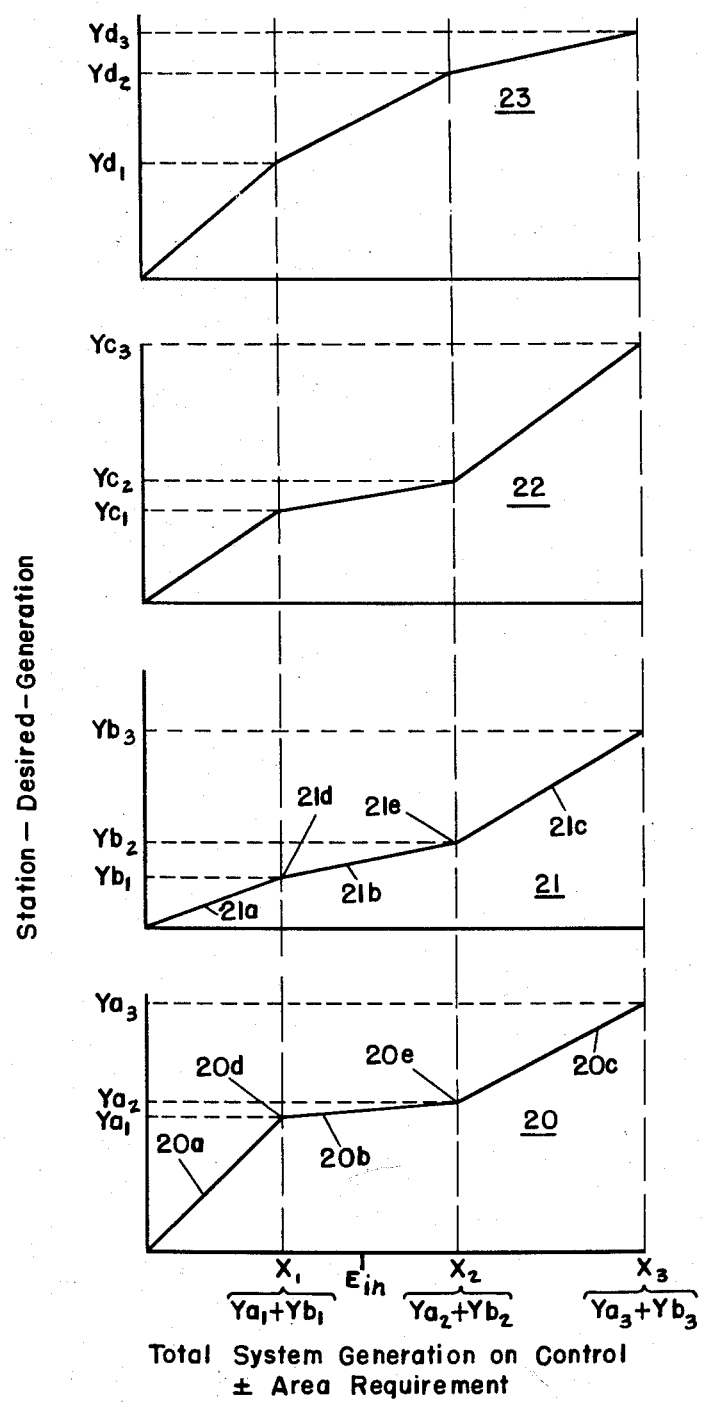
FIG. 2 illustrates graphs helpful in explaining the invention.

For example, in FIG. 2 the loading curves 20 and 21 for the Stations A and B include initial segments 20a, 21a, intermediate segments 20b, 21b, and final segments 20c and 21c. The segments 20a–20c and 21a–21c have corresponding breakpoints at $X_1$, $X_2$ and $X_3$, i.e., where the adjacent straight-line segments meet. These breakpoints at $X_1$, $X_2$ and $X_3$ occur at the same values of the total system generation on control plus or minus the area requirement of the generating area. Thus, the curves have been plotted with total generation requirements of the generating area as abscissae and with Station-desired-generation as ordinates. The curve 22 and 23 are similar and are exemplary of the loading curves for addiional stations of which there may be many in the generating area. If the generation requirements of the area lie between $X_1$ and $X_2$, then for the Stations A and B the loading should be as indicated by the segments 20b and 21b, each of which represents a linear relationship between station loading and total generation requirements.

It is to be understood that the loading curves 20–23 will represent the optimum loading of each station, taking into consideration the generating facilities available, their relative capacities and the applicable incremental costs. These curves may include the weighing of such factors as loadings and losses on transmission lines within the areas, the stream flow and storage conditions of hydroelectric plants, and the loading curves. The loading curves may be those produced by computers of kinds well known to those skilled in the art, including those of the analog and digital type and also loading slide rules which correlate for computation purposes a plurality of conditions.

A feature of the present invention resides in the fact that when the total generation requirement lies between $X_1$ and $X_2$, the curves 20b and 21b will be set into a computing network by setting therein the values of the ordinates for the respective breakpoints 20d, 20e and 21d, 21e. The values for the abscissae corresponding with $X_1$ and $X_2$ are obtained by summing operations later to be explained.

Returning now to FIG. 1, generation-representative signals are derived from slidewires 25 and 26, the movable contacts 25a and 26a of which are respectively adjusted by the wattmeters 12 and 13 for application to an input conductor 27 of a summing amplifier 28. The circuits from the contacts 25a and 26a respectively include summing resistors 31 and 32. The input conductor 27 also has applied to it by way of a summing resistor 33 an error signal commonly referred to as "area requirement." This area-control error-signal is obtained from a slidewire 34, the movable contact 34a of which is adjusted in response to change in frequency of the system and the flow of power to and from the area under control by way of tieline 15. Thus, the contact 34a is adjusted in accordance with a control system 36 which produces a mechanical output proportional to the magnitude of the area requirement as determined from the outputs from a frequency meter 37 and the wattmeter 16. Such an area requirement system is disclosed in Carolus Patent 2,688,728.

From the foregoing, it will be seen that the input to the amplifier 28 represents the sum of the actual generation of the several stations including generators 10 and 11 and the area requirement. The actual generation will hereinafter frequently be referred to as the controlled generation in that provisions will later be described by means of which a station, after reaching a predetermined limit, will no longer be subject to change in generation and, accordingly, that station will be removed from the summing circuit just described.

The amplifier 28 produces on its output circuit an output representative of the total generation requirements of the system as a whole. That output is applied by way of a negative feedback resistor 38 to the input circuit to provide the heretofore described summing action. The signal representative of the total generation requirements of the system is applied by way of a summing resistor 41 to a summing amplifier 42 which also receives at its input circuit through summing and feedback resistors 43 and 44 signals representative respectively of the desired generation for Stations A and B. The signals applied by way of the resistors 43 and 44 are negative as compared with the signal from resistor 41 and, therefore, reduce the input signal to the summing amplifier 42 to a low value, approaching zero as a limit.

The output of the amplifier 42 has been indicated to be $-E_0$. That output is applied to an input resistor 45 of an inverter 46, shown as an amplifier, with a negative feedback circuit including a feedback resistor 47. The inverter 46 produces an output which has been labeled $+E_0$. The outputs from the amplifiers 42 and 46 are applied to lines labeled respectively $+E_0$ and $-E_0$. To the former there are connected voltage dividers shown as potentiometers 51 and 52, while potentiometers 53 and 54 are connected to the latter line. The movable contacts of these potentiometers have been labeled $Ya_1$, $Ya_2$, $Yb_1$ and $Yb_2$. An additional potentiometer 55 with its movable contact labeled $Y'a_1$ is preferably identical with potentiometer 51, though supplied from a constant voltage source marked S. (Other potentiometers in the system, where supplied from a separate source, have similarly been illustrated with input terminals to which there has been applied the reference character S to indicate a suitable source of supply. The system may function either with direct current or alternating current, this being the reason for the adoption of the symbol S.)

As will be later explained, the breakpoint 20d is set on potentiometer 51 by the contact $Ya_1$, which contact has associated with it a scale calibrated in terms of station generation. Similarly, the breakpoint 20e will be set by the contact $Ya_2$, and the breakpoints 21d and 21e will be set in their respective potentiometers by the contacts $Yb_1$ and $Yb_2$. It will be observed that the contacts $Ya_1$ and $Y'a_1$ are mechanically interconnected as by the connection illustrated by the broken line 56 so that the contact $Y'a_1$ has a setting corresponding with that of $Ya_1$.

With the foregoing setting of the ordinate contacts of potentiometers 51–55, the generation of Stations A and B will be regulated in accordance with the straight-line sections 20b and 21b of the loading curves of FIG. 2. This result is accomplished in part by the connections of the contacts $Ya_1$, $Y'a_1$ and $Ya_2$ to a summing amplifier 58 by way of summing resistors 59 and 60 and 61. The summing amplifier 58 is provided with a negative feedback resistor 62. The output from the summing amplifier 58 is applied to output terminals 63, the output signal being representative of the desired generation of Station A for the existing total generation requirement of the area. The output signal from the amplifier 58 is likewise applied by way of a conductor 64 to the negative feedback resistor 43.

As later explained, there will be provided for Station B an additional amplifier corresponding with the amplifier 58 for producing an output signal corresponding with desired generation for Station B, and the output therefrom will be applied by way of a conductor 65 to the negative feedback resistor 44 forming a part of the computer for determining desired generation for Station A.

It will be obvious from an inspection of the input circuit to the summing amplifier 58 that the output will be proportional to the several inputs. Accordingly, instead of utilizing the single feedback circuit from the output of summing amplifier 58, the several inputs thereto may after polarity inversion be applied to the input circuit of amplifier 42 in place of the single connection 64.

Before describing the more complex system, there will now be presented a discussion of the underlying theory by means of which the foregoing results are achieved.

It will be observed that in FIG. 1, the output of amplifier 58 has a label in the form of an equation which defines that output. For convenience, that equation is as follows:

Station A—Desired Generation
$$=\frac{[-E_{in}-(Y'a_1+Y'b_1)](Ya_2-Ya_1)}{(Ya_2+Yb_2)-(Ya_1+Yb_1)}+Y'a_1 \quad (1)$$

The foregoing equation states that Station A desired generation is explicitly determined in terms of the setting of the contacts on potentiometers 51–55 and by an input signal "$-E_{in}$," if this signal $-E_{in}$ be taken as representative of the total desired generation and of a value lying between the limits $X_1$ and $X_2$. From FIG. 2 it will be seen that the total system generation on control, plus or minus the area requirement for the point $X_1$ is equal to $Ya_1+Yb_1$. Similarly, the system generation for the point $X_2$ is equal to $Ya_2+Yb_2$. The foregoing assumes the stations represented by curves 22 and 23 are not under control, having reached a control limit.

If it now be assumed that the total system generation on control, plus or minus the area requirement, has a value of $E_{in}$, then the value between $X_1$ and $E_{in}$ will be equal to $(E_{in}-X_1)$ which is equal to $[E_{in}-(Ya_1+Yb_1)]$. If this quantity be multiplied by the ratio of the distance $(Ya_1-Ya_2)$ to the distance $(X_1-X_2)$ and there be added to the product the value of $Ya_1$, there will be determined $Ya$, the desired station generation. The distance $(Ya_2-Ya_1)$ has a value represented by the settings of the potentiometers 51 and 53. The distance $(X_1-X_2)$ may likewise be determined by a summation of the values representative of the ordinate points previously identified.

The foregoing may be summarized mathematically. The output from the summing amplifier 58 as it appear at output terminals 63 may be expressed as follows:

$$E_{63}=\frac{E_0Ya_2}{Y_t}-\frac{E_0Ya_1}{Y_t}+Y'a_1 \quad (2)$$

The first term on the right-hand side of Equation 2 sets forth that the input signal applied to the summing resistor 61 is equal to the product of $-E_0Ya_2$ divided by the total resistance, $Y_t$, of the resistor or potentiometer 53. This term as it appears in the output of amplifier 58 is inverted, i.e., its sign changes to a plus. Similarly, the second term represents the ratio of the product $+E_0Ya_1$ and the total resistance $Y_t$ of the resistor 51, the sign again reversing as the second term appears at the output of amplifier 58. The third term is derived from the resistor or potentiometer 55 and has a value of $-Y'a_1$ as applied to resistor 60, but is positive as it appears in the output of amplifier 58.
Equation 2 may be simplified:

$$E_A = E_{63} = E_0 \frac{(Ya_2 - Ya_1)}{Y_t} + Y'a_1 \qquad (3)$$

It will be obvious that there will be a corresponding equation for Station B, and it is as follows:

$$E_B = E_{107} = E_0 \frac{(Yb_2 - Yb_1)}{Y_t} + Y'b_1 \qquad (4)$$

Considering now the summing amplifier 42 and remembering that the resistors 43 and 44 are negative feedback resistors, the effect will be to reduce the input to the amplifier 42 to a small value, approaching zero as a limit. (The amplifier 42 has a high gain so that zero may be approached to a close approximation with the amplifier 42 still having a finite output for producing the output corresponding with $-E_0$.)

Applying Kirchhoff's law and considering the input to the amplifier 42 as a current-junction point, then all of the currents entering and leaving that point will be equal to zero. Considering that the resistors 41, 43 and 44 are all equal to unity, and that the current to the amplifier 42 is substantially zero, then the following equation applies:

$$E_{in} + E_0 \frac{(Ya_2 - Ya_1)}{Y_t} + Y'a_1 + E_0 \frac{(Yb_2 - Yb_1)}{Y_t} + Y'b_1 = 0 \qquad (5)$$

Solving now for $E_0$:

$$E_0 = \frac{(-E_{in} - Y'a_1 - Y'b_1)Y_t}{(Ya_2 - Ya_1) + (Yb_2 - Yb_1)} \qquad (6)$$

Equation 6 may now be substituted in Equation 3 to obtain the following:

$$E_{63} = \frac{[-E_{in} - (Y'a_1 + Y'b_1)](Ya_2 - Ya_1)}{(Ya_2 + Yb_2) - (Ya_1 + Yb_1)} + Y'a_1 \qquad (7)$$

It will be recognized that the right-hand expression of Equation 7 is the same as Equation 1 as it appears in FIG. 1, thus establishing the mathematical accuracy of that equation. It is here emphasized that $E_{in}$, representative of the total desired system generation at a given point lying between the established limits must be introduced into the system as a negative quantity to satisfy Equations 1 and 7. Explicitly, $E_{in}$, the voltage applied to the input of the summing resistor 41, is negative with respect to the voltage applied to the output of that summing resistor as from the negative feedback resistors 43 and 44. $E_{in}$ will have the same polarity or phase as the source S supplying the resistor 55.

It is to be here observed that the value of $Y'a_1$ is equal to the value of $Ya_1$, that is to say, these two terms both identify the same ordinate values for the breakpoint 20d. Similarly, $Yb_1$ and $Y'b_1$ represent the same ordinate values for the breakpoint 21d.

In the foregoing, the simplest form of equation has been utilized, though in FIG. 2 there have been illustrated the additional loading curves 22 and 23 which may, of course, be taken into account by a simple expansion of the system as clearly indicated by the foregoing development.

There will now be considered the operation of the system in which the total desired system generation moves from a range between the values $X_1$ and $X_2$ to the values $X_2$ and $X_3$. Such a system has been illustrated in FIGS. 3A and 3B where corresponding parts have been given corresponding reference characters.

Figure 3A:
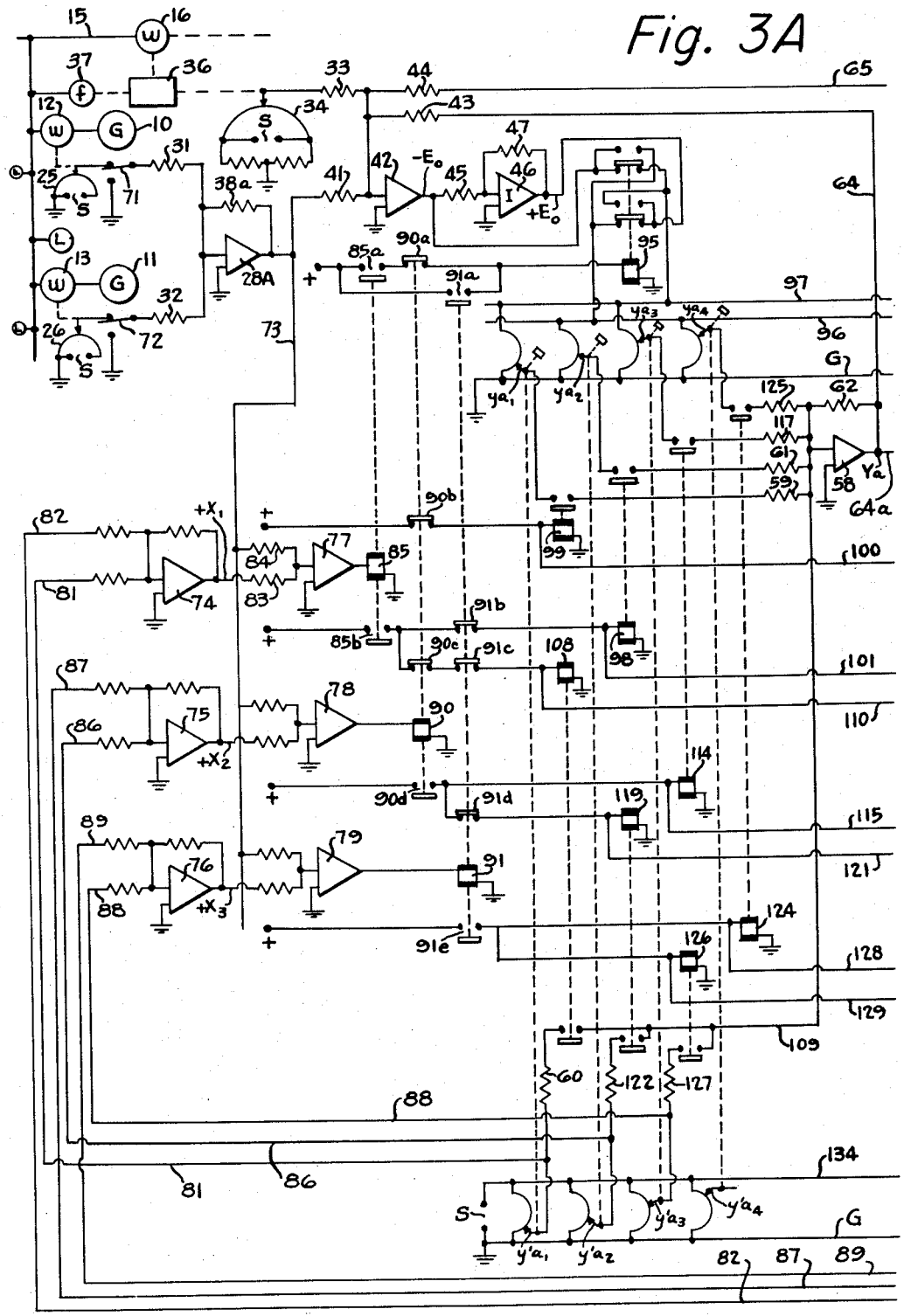
FIGS. 3A and 3B illustrate schematically a wiring diagram of a preferred embodiment of the invention.
Figure 3B:
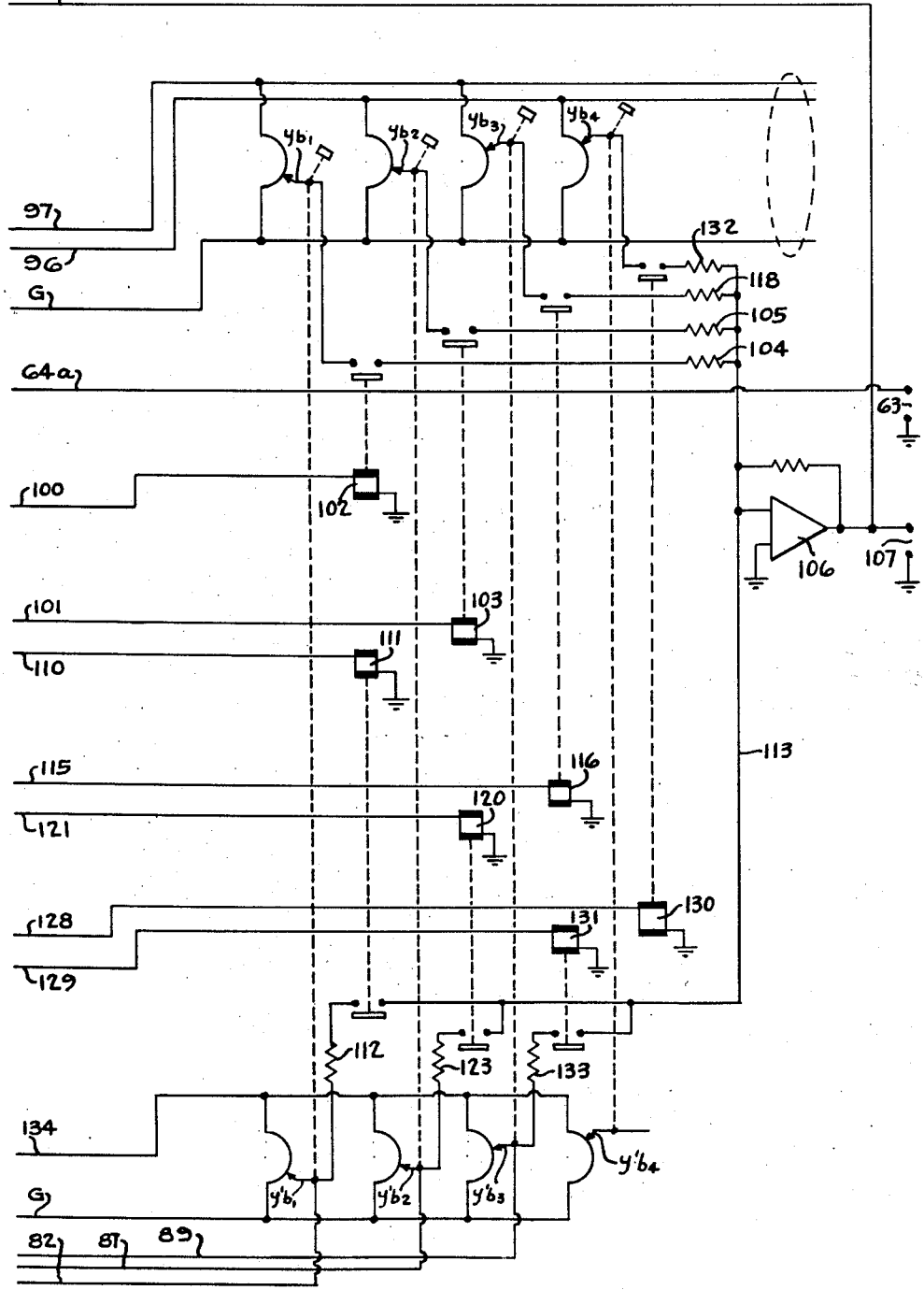

In FIGS. 3A and 3B it will be observed that the output circuits from potentiometers 25 and 26 include single-pole, double-throw switches 71 and 72. These are provided in order to remove from the input circuit of a summing amplifier 28A the signal representative of station generation at any time the generation of that station reaches a limit. Whenever a station reaches one of its limits and its corresponding double-throw switch (71 or 72) is operated as just described, its corresponding limit-setting means will at that time be operated on its slidewire to its zero position. This may be done either manually, or by providing simple relay means (not shown) which upon opening of one of the switches deenergizes the voltage divider or slidewire comprising such limit-setting means. The summing amplifier 28A functions in a manner similar to the amplifier 28 of FIG. 1 but differs in that it has applied to its input circuit signals representative of the generation of Station A and of Station B without having applied to its input circuit signals representative of area requirement.

In the system of FIGS. 3A—3B, the area requirement signal from the slidewire 34 is applied by way of a summing amplifier 42 which also includes a summing resistor 41 connected to the output of amplifier 28A. Though not necessarily essential to the invention, the above arrangement has been illustrated to have developed on conductor 73 a signal representative only of actual controlled generation of the area and with the area requirement divorced therefrom. Though the relays may be operated from a combined signal, in the arrangement shown there will be utilized a slower changing signal in conjunction with the operation of relays later to be described.

Potentiometers corresponding with potentiometers 51-55 of FIG. 1 are in FIGS. 3A—3B identified by the reference characters $Ya_1 - Ya_4$, $Y'a_1 - Y'a_4$, etc., and respectively applied to the movable contacts thereof. The voltage dividers or potentiometers for values $Y'b_1$ ... etc. are energized from source S by way of conductor 134 and the grounded conductor G. These potentiometers correspond with four-segment loading curves, only three of which have been shown in FIG. 2. In the system of FIGS. 3A—3B, there are automatically determined the linear segments of the loading curves along which there will be controlled the generation of the stations, and in response to the foregoing summation circuits there will be set into the computer the corresponding ordinate values of the breakpoints of the loading curves. Assuming the parts are in their illustrated positions and that the total system generation on control has the value $E_{in}$ as illustrated in FIG. 2, the following occurs.

There are applied to the input circuit of a summing amplifier 74 of the negative feedback type, by way of conductors 81 and 82, signals representative of the ordinate values corresponding with $Ya_1$ and $Yb_1$, the sum of which for a two-station system is equal to the value $X_1$ of FIG. 2. If the sum of the actual generations from all stations be greater than the sum represented by the ordinate points $Ya_1$ and $Yb_1$, it will be known that these two stations will be loaded in a region above the abscissae value $X_1$ of FIG. 2. The foregoing comparison is made by applying the output from amplifier 74 through a summing resistor 83 to an amplifier 77 which also has applied to its input the signal of conductor 73 as by way of summing resistor 84. Assuming that the sum of actual generation exceeds in magnitude the sum of the ordinate values, then the amplifier 77 will have an output for energization of the operating coil of a relay 85 which closes its normally open contacts. Similarly, the amplifiers 75 and 76 have respectively applied thereto as by conductors 86, 87 and 88, 89 input signals respectively representative of the ordinate points $Ya_2$, $Yb_2$ and $Ya_3$, $Yb_3$. Similarly, amplifiers 78 and 79 compare respectively the magnitudes of the outputs from amplifiers 75 and 76 with the actual generation signal of conductor 73.

It will be remembered that the energization of relay 85 represented only the fact that actual generation exceeded the sum of the initial ordinate points. If now the output of amplifier 78 energizes the coil of a relay 90, it will be known that the actual generation exceeds the sum of the ordinate points at the point $X_2$ of FIG. 2. In such an event, the normally closed contacts 90a of relay 90 are opened to eliminate the effect of the contacts 85a on control system features later to be described. Similarly, if the amplifier 79 energizes the operating coil of relay 91, it will be known that actual generation lies above the point $X_3$ of FIG. 2. However, if only the relay 85 be energized, it will be known that actual generation corresponds with a value such as $E_{in}$ of FIG. 2 and in the range between $X_1$ and $X_2$.

The closure of contacts 85a of the relay 85 completes an energizing circuit for the operating coil of a relay 95 which thereupon operates to close its normally open, upper contacts, thereby to connect the output voltage ($-E_0$) from summing amplifier 42 to the conductor 96. It may be here observed that in the deenergized position of relay 95, the output voltage of amplifier 42 is connected to the conductor 97. In the deenergized position of relay 95, conductor 96 is connected through the lowermost, normally closed contacts to the output voltage ($+E_0$) from the inverter 46. Similarly, in the energized position of relay 95 conductor 97 is connected to the output of the inverter 46. Thus the relay 95 is a circuit reversing means which reverses the relative polarities of conductors 96 and 97 relative to ground conductor G, and for purposes later to be described. With the relay 95 energized, conductor 97 is connected to the voltage $+E_0$, and the conductor 96 to the voltage $-E_0$ which conforms with the system of FIG. 1 where the potentiometers of contacts $Ya_1$ and $Yb_1$ were connected to $+E_0$, while the potentiometers for contacts $Ya_2$ and $Yb_2$ were connected to the voltage $-E_0$.

The closure of contacts 85b of relay 85 completes an energizing circuit through the normally closed contact 91b for the operating coil of a relay 98 which thereupon closes its contacts to connect the contact $Ya_2$ to the summing resistor 61 of amplifier 58. There is completed by the normally closed contacts 90b of relay 90 an energizing circuit for a relay 99 which is thereby operated to close its contacts to complete a connection from contact $Ya_1$ to the summing resistor 59.

The relay contacts 90b and 91b also complete energizing circuits by way of conductors 100 and 101 for relays 102 and 103, which thereupon close to complete circuits from contacts $Yb_1$ and $Yb_2$ to the summing resistors 104 and 105 of the negative feedback type of summing amplifier 106. The output of the amplifier 106 develops at output terminals 107 a signal $E_{107}$ representative of the desired generation for Station B. As explained in connection with FIG. 1, that output signal is applied by way of conductor 65 to the summing resistor 44 of amplifier 42 and is so illustrated in FIGS. 3A and 3B. For convenience, the output terminals 63 have again been illustrated in FIG. 3B, and they have applied thereto by way of conductor 64a a signal $E_{63}$ representative of the desired generation for Station A.

The closure of contacts 85b of relay 85 also completes an energizing circuit by way of normally closed contacts 90c of relay 90, normally closed contacts 91c of relay 91, for a relay 108 which closes its contacts to complete a circuit from the contact $Y'a_1$ by way of summing resistor 60 and conductor 109 to the input circuit of the summing amplifier 58.

The closure of contacts 85b also completes by way of a conductor 110 an energizing circuit for a relay 111 which is thereupon energized to complete a connection from the contact $Y'b_1$ through a summing resistor 112 to the input conductor 113 of the summing amplifier 106.

There have now been established in the system of FIGS. 3A and 3B the circuits above described for FIG. 1. Accordingly, a description of the operation of the system of FIGS. 3A and 3B need not be repeated.

Assuming now that the total controlled generation as represented by the voltage on conductor 73 exceeds a value corresponding with $X_2$ of FIG. 2, and thus exceeds in magnitude the output from amplifier 75, the amplifier 78 will energize the relay 90 which thereupon operates to close its normally open contacts 90d and to open its contacts 90a–90c. It is to be noted the relay 85 remains energized. The opening of the relay contacts 90a deenergizes the relay 95 which thereupon returns to its illustrated position to connect the output of amplifier 42 to the conductor 97 and to connect the inverter 46 to the conductor 96. This operation has the effect of changing the breakpoint $X_2$ which previously represented the upper limit to a breakpoint corresponding with the lower limit of the range between $X_2$ and $X_3$. The opening of contacts 90b, of course, deenergizes relays 99 and 102. Similarly, the opening of contacts 90c deenergizes relays 108 and 111.

The closure of relay contacts 90d energizes a relay 114 and by a conductor 115 energizes a relay 116. The relay 114 connects the contact $Ya_3$ to a summing resistor 117 of amplifier 58, while the relay 116 connects the contact $Yb_3$ to a summing resistor 118 of the amplifier 106. There are also completed by way of contacts 90d energizing circuits for relays 119 and 120. Both circuits may be traced by way of normally closed contacts 91d of relay 91. The second energizing circuit is completed by way of a conductor 121. The relays 119 and 120 complete circuits respectively from the contact $Y'a_2$ by way of a summing resistor 122 to the conductor 109 of amplifier 58; and from the contact $Y'b_2$ by way of a summing resistor 123 to the conductor 113 of summing amplifier 106.

There have now been established the connections for operation of the system in the same manner as described in connection with FIG. 1, except that now the system functions to compute the desired generation for the several stations during the time the total system generation on control has values between the limits $X_2$ and $X_3$ of FIG. 2.

In terms of the equations discussed above, the control functions may now be expressed as follows. For Station A:

$$E_{63} = \frac{[-E_{in}-(Y'a_2+Y'b_2)](Ya_3-Ya_2)}{(Ya_3+Yb_3)-(Ya_2+Yb_2)} + Y'a_2 \quad (8)$$

For Station B:

$$E_{107} = \frac{[-E_{in}-(Y'a_2+Y'b_2)](Yb_3-Yb_2)}{(Ya_3+Yb_3)-(Ya_2+Yb_2)} + Y'b_2 \quad (9)$$

Though the fourth segments of the loading curves have not been illustrated in FIG. 2, it will be understood that in practical applications there may be many such additional segments, and thus the terms of the applicable equations will take into account these additional segments as well as an increased number of stations.

If there are $n$ stations and $m$ represents the lower breakpoint of the applicable load-curve segment, $$Y_n = \text{Desired Sta. Gen.} = \frac{[-E_{in}-(Y'a_m+Y'b_m+\ldots Y'n_m)](Yn_{(m+1)}-Yn_m)}{(Ya_{(m+1)}+Yb_{(m+1)}+\ldots Yn_{(m+1)})-(Ya_m+Yb_m+\ldots Yn_m)} + Y'n_m \quad (10)$$

When the total system generation on control exceeds the value of $X_3$ of FIG. 2, then the amplifier 79 will energize the relay 91 which, upon closing its contacts 91a, energizes the relay 95, and on opening its contacts 91b, 91c and 91d deenergizes relays 98, 103, 108, 111, 119 and 120. The closing of its contacts 91e energizes a relay 124 to connect contact $Ya_4$ by way of summing resistor 125 to the amplifier 58. There is also energized a relay 126 which connects contact $Y'a_3$ by way of summing resistor 127 to input conductor 109 of amplifier 58, and contacts 91e of relay 91 also complete by way of conductors 128 and 129 energizing circuits for relays 130 and 131. The relay 130 connects contact $Yb_4$ by way of a summing resistor 132 to the amplifier 106, while the relay 131 connects the contact $Y'b_3$ by way of a summing resistor 133 to input conductor 113 of amplifier 106. Accordingly, the system now functions to produce outputs at output terminals 63 and 107 representative of the desired generation for Stations A and B with the operation between the limit $X_3$ of FIG. 2 and the limit $X_4$ (not shown in FIG. 2).

In practice, there will be additional stations, and these will be provided for by providing duplicates of that part of the system illustrated in FIG. 3B, one for each station. The simple extension of the system to include additional stations will be quite obvious from the manner in which there has been added to the system of FIG. 3A the features which include Station B as a part thereof.

Now that the invention has been explained in connection with typical embodiments thereof, it will be understood that many modifications may be made within the scope of the appended claims.

In summary, the invention includes an analog computing network having a plurality of adjustable circuit elements $Ya_1$, $Yb_1$, etc., corresponding in number with the number of breakpoints of the loading curves and respectively adjustable to values proportional to the several levels of station generation at the breakpoints. Selected circuit components are by the relays previously described connected to the input conductor of the summing amplifier 58 with one of the circuit components representing the generation level at the lower limit of a linear segment of a loading curve. By providing additional amplifying means, such as the amplifier 42, selected circuit components are energized from the output of that amplifier with other circuit elements energized from an inverter 46, all as has been described in connection with the conductors 96 and 97 and the circuit-reversing means 95. The foregoing circuit components and corresponding with $Y'a_1$, $Y'b_1$, etc., provide means for establishing the limit signals as from the outputs of summing amplifiers 74–76 for actuation of the comparison amplifiers 77–79 to predetermine the circuit components connected to the summing amplifier 58. The system is completed by the feedback connection to the input conductor of summing amplifier 42, these feedback connections applying thereto the desired station generation for the several stations under control.

Though the present invention has been explained in considerable detail in connection with generation control systems, it is to be understood it is not liimted thereto, since the control features thereof are applicable to widely differing systems. The invention is particularly adapted to the control of generation of sources whether of a plurality of interconnected generators including tielines, the generators considered in groups as in stations, or as combined by a plurality of stations fo form areas or as areas controlled as described above for the Stations A and B.

As described above, the signal appearing on conductor 73 represents actual controlled generation. Where the signal on conductor 73 is to include area requirement, then an additional summing resistor will be added to each of the inputs of amplifiers 77, 78 and 79, and to each said summing resistor there will be applied the signal from the slidewire 34 which is proportional to area requirement. It will be added algebraically to the signal on conductor 73, that is to say, it may be either subtractive or additive. Accordingly, the signal effectively applied to amplifiers 77–79 as from conductor 73 as well as the signal from slidewire 34 may be referred to as a generation signal.

While in the foregoing description the computation of the individual desired station generations has been with respect to the lower limit of the applicable segment it is to be understood that corresponding computations of desired station generations could be made with respect to the upper limit of the applicable segment. In the latter case where there are $n$ stations and $m$ represents the lower breakpoint of the applicable segment $$Y_n = \text{Desired Sta. Gen.} = Y'n_{(m+1)}$$

$$-\frac{[(Y'a_{(m+1)} + Y'b_{(m+1)} \ldots + Y'n_{(m+1)}) - (-E_{in})]}{(Ya_{(m+1)} + Yb_{(m+1)} \ldots + Yn_{(m+1)}) - (Ya_m + Yb_m \ldots + Yn_m)} (Yn_{m+1} - Yn_m)$$

(11)

What is claimed is:

1. A system for dividing an input signal into a plurality of output signals the sum of which is representative of said input signal comprising means for establishing for each output signal an upper and lower limit of its range over which said output varies in linear relation with said input, means for summing said established limits for each said output for producing the corresponding upper and lower limits of the range for said input signal, an output summing means, and means for applying to said output summing means for each said output quantities representative of the lower limit of the range for its respective output and representative of the amount said output should be above said lower limit in accordance with the amount said input is above the lower limit of said corresponding input range for producing from said output summing means said output signals.

2. A system as in claim 1 and including an input summing means to which is applied said input signal and said output signals whereby the sum of said output signals is at all times proportional to said input signal.

3. In a generation control system having means for producing an input signal of amplitude representative of a total desired generation, the combination of means for dividing said input signal into a plurality of output signals each representative of the desired generation of a source comprising means for establishing for each said output signal an upper limit and a lower limit between which each said output signal varies as a linear function with change in said input signal, summing means responsive respectively to signals representative of said upper and said lower limits for producing corresponding upper and lower limits of said input signal, output summing means, and means for applying to said output summing means quantities representative of said lower limits of each said output signal and representative of the amount each said output signal should be above its lower limit in proportion to the amount said input is above its said lower limit for producing from said output signals outputs each representative of the desired generation for said sources.

4. The combination of claim 3 in which there are provided means responsive to said input signal and to said summing means for said limits for concurrently changing the respective ranges between said upper limits and said lower limits of said output signals to establish a new range over which each said output signal varies in linear relationship.

5. The combination of claim 4 in which said last-named means establishes for the new range lower limits corresponding with the upper limits of the range previously established or in which the lower limit of the range previously established corresponds with the upper limit of the new range.

6. The combination of claim 5 in which there are provided a plurality of circuit-controlling means for establishing the control range between selected upper and lower limits for said source in response to the magnitudes of said input signal and of the output of said summing means for said limits.

7. In a generation control system for a plurality of sources and in which each source has between a lower limit and an upper limit a linear relationship between its change of generation and change in total generation, comprising means for generating signals $Ya_1$ and $Ya_2$ representative respectively of said lower and upper limits of said source generation, means for generating signals $X_1$ and $X_2$ respectively representative of total generation corresponding with said lower and upper limits and respectively equal to $$(Ya_1 + Yb_1 + Yc_1 \ldots + Yn_1)$$
$$(Ya_2 + Yb_2 + Yc_2 \ldots + Yn_2)$$

means for generating a signal $(-E_{in})$ representative of the total desired generation and lying between said upper and lower limits for said total generation, and means for producing an output signal of magnitude proportional to the signal $Ya_1$ plus the product of the difference between the signal $E_{in}$ minus the signal $X_1$ multiplied by the difference between the signal $Ya_2$ and $Ya_1$ and divided by the difference between the signal $X_2$ minus $X_1$ for determining the desired generation of a source where $X_1$ represents the sum of said signals corresponding with the lower limits of each range of each source and where $X_2$ equals the sum of the signals representative of said upper limit of said range of each source whereby there is produced an operation pursuant to the following equation where the desired generation of a source equals $$\frac{[-E_{in}-(Ya_1+Yb_1+Yc_1\ldots+Yn_1)](Ya_2-Ya_1)}{(Ya_2+Yb_2+Yc_2\ldots Yn_2)-(Ya_1+Yb_1+Yc_1\ldots+Yn_1)}+Ya_1$$

8. A function generator for an interconnected generating area made up of a plurality of generating stations each having at least one generator, each of said generating stations having a loading curve representing the desired generation of the station in terms of the total controlled-generation requirements of the area and approximated by a plurality of straight-line segments some of which have slopes differing from others, each said segment joining an adjacent segment at a breakpoint, the corresponding breakpoints of all of said loading curves occurring at corresponding values of said total controlled-generation requirements of said area, comprising means for generating a plurality of signals each in magnitude proportional to desired values of generation of each station at corresponding breakpoints, means for generating a signal representative of said controlled-generation requirements of the area, computing means jointly responsive to said signals for producing outputs to meet said total controlled-generation requirements of said area and respectively representative of desired generation of each said station, and means responsive to said requirements of the area for establishing operation of said computing means in accordance with the corresponding individual straight-line segments determined by adjacent breakpoints.

9. A function generator for an interconnected generating area made up of a plurality of generating stations each having at least one generator, each of said generating stations having a loading curve representing the desired generation of the station in terms of the total controlled-generation requirements of the area and approximated by a plurality of straight-line segments some of which have slopes differing from others, each said segment joining an adjacent segment at a breakpoint, the corresponding breakpoints of all of said loading curves occurring at corresponding values of said total controlled-generation requirements of said area, comprising means for generating a plurality of signals each corresponding respectively in magnitude with desired values of generation of each station at corresponding breakpoints, means for generating a signal reprsentative of said controlled-generation requirements of the area, and computing means jointly responsive to said signals for producing outputs to meet said total controlled-generation requirements of said area and respectively representative of desired generation of each said station in accordance with said individual straight-line segments determined by said adjacent breakpoints.

10. A generation control system for an interconnected generating area made up of a plurality of generating stations each having at least one generator, each of said generating stations having a loading curve representing the desired generation of the station in terms of the total controlled-generation requirements of the area and approximated by a plurality of straight-line segments of varying degrees of slope, each said segment joining an adjacent segment at a breakpoint, the corresponding breakpoints of all of said loading curves occurring at corresponding values of said total generation requirements of said area, comprising means including a plurality of summing circuits having applied thereto signals representative respectively of station generation at said breakpoints for producing a plurality of limit-signals each in magnitude proportional to the sum of the several values of generation of said stations at said corresponding breakpoints, means for producing an area-generation signal, comparison means in number corresponding with the number of said breakpoints for comparing said area-generation signal with each of said limit signals, and means jointly responsive to the outputs of said comparison means and to said area generation signal for producing a plurality of desired generation output signals one for each said station proportional in magnitude to the desired generation of each station to meet the area-generation requirement with each generating station loaded in accordance with its straight-line segment between adjacent breakpoints between which said area-generation requirement lies.

11. A generation control system for an interconnected generating area made up of a plurality of generating stations each having at least one generator, each of said generating stations having a loading curve representing the desired generation of the station in terms of the total controlled-generation requirements of the area and approximated by a plurality of straight-line segments of varying degrees of slope, each said segment joining an adjacent segment at a breakpoint, the corresponding breakpoints of all of said loading curves occurring at corresponding values of said total generation requirements of said area, comprising means including a plurality of summing circuits having applied thereto signals representative respectively of station generation at said breakpoints for generating a plurality of limit-signals each in magnitude proportional to the sum of the several values of generation of said stations at said corresponding breakpoints, means for producing an area-generation signal, comparison means in number corresponding with the number of said breakpoints for comparing said area-generation signal with each of said limit signals, and means jointly responsive to the outputs of said comparison means and to said area-generation signal for producing a plurality of desired generation-output signals, one for each said station proportional in magnitude to the desired generation of each station to meet the area-generation requirement with each generating station loaded in accordance with its straight-line segment between adjacent breakpoints between which said area-generation requirement lies, said jointly responsive means including an amplifier having negative feed-back circuits respectively energized by signals proportional in amplitude to the respective generation levels of said stations at said breakpoints between which said area-generation requirement lies.

12. A generation control system for an interconnected generating area made up of a plurality of generating stations each having at least one generator, each of said generating stations having a loading curve representing the desired generation of the station in terms of the total controlled-generation requirements of the area and approximated by a plurality of straight-line segments of varying degrees of slope, each said segment joining an adjacent segment at a breakpoint, the corresponding breakpoints of all of said loading curves occurring at corresponding values of said total generation requirements of said area, comprising means including a plurality of adjustable circuit elements corresponding in number with the number of said breakpoints and respectively set to values proportional to the several levels of station generation at said breakpoints, summing means, means including said circuit components for applying to said summing means signals proportional to adjacent breakpoints of loading curves of each of the respective generating stations plus the generation level of each station at the breakpoint of lesser value, amplifying means having an input circuit and an output circuit, means connecting said output circuit to selected ones of said circuit components, an inverter having its input connected to the output of said amplifier, said inverter having an output circuit for supplying the remaining of said circuit components, and means for applying to the input of said amplifier the output from each of said summing means and an area-generation signal.

13. The generation control system of claim 12 in which there is interposed between said selected circuit components and said remaining circuit components circuit-reversing means for interchanging the connections from said amplifying means and from said inverter to said circuit components.

14. The generation control system of claim 13 in which said circuit-reversing means is operated from one to the other of said positions as said area-generation requirement changes in magnitude from values lying between one adjacent pair of breakpoints to a value lying between a second adjacent pair of breakpoints.

15. The generation control system of claim 14 in which said circuit-reversing means includes means including a plurality of summing circuits having applied thereto signals representative respectively of station generation at said breakpoints for producing a plurality of limit signals each in magnitude proportional to the sum of the several values of generation of said stations at corresponding breakpoints, comparison means in number corresponding with the number of said breakpoints for comparing at least one generation signal with each of said limit signals, and means responsive to the outputs of said comparison means for operating said circuit-reversing means from one to the other of its positions each time the magnitude of said generation signal changes above or below the magnitude of one of said limit signals.

16. The generation control system of claim 15 in which there are provided relay means associated with the outputs of said comparison means for controlling the operation of said circuit-reversing means and in which there are associated with said circuit components a plurality of circuit-changing devices operative under the control of said relay means for selectively connecting said circuit components to said summing means in response to the outputs from said comparison means.

17. A system for dividing an input signal into a plurality of output signals the sum of which is representative of said input signal comprising means for establishing for each output signal an upper and lower limit of its range over which said output varies in linear relation with said input, means for summing said established limits for each said output for producing the corresponding upper and lower limits of the range for said input signal, an output summing means, and means for applying to said output summing means for each said output quantities representative of one limit of the range for its respective output and representative of the amount said output should deviate from said one limit in accordance with the amount said input deviates from the corresponding limit of said corresponding input range for producing from said output summing means said output signals.

18. In a generation control system for a plurality of sources and in which each source has between a lower limit and an upper limit a linear relationship between its change of generation and change in total generation, comprising means for generating signals $Ya_1$ and $Ya_2$ representative respectively of said lower and upper limits of said source generation, means for generating signals $X_1$ and $X_2$ respectively representative of total generation corresponding with said lower and upper limits and respectively equal to $$(Ya_1+Yb_1+Yc_1 \ldots +Yn_1)(Ya_2+Yb_2+Yc_2 \ldots +Yn_2)$$

means for generating a signal $(-E_{in})$ representative of the total desired generation and lying between said upper and lower limits for said total generation, and means for producing an output signal of magnitude proportional to the signal $Ya_2$ minus the product of the difference between the signal $X_2$ minus the signal $(-E_{in})$ multiplied by the difference between the signal $Ya_2$ and $Ya_1$ and divided by the difference between the signal $X_2$ minus $X_1$ for determining the desired generation of a source where $X_1$ represents the sum of said signals corresponding with the lower limits of each range of each source and where $X_2$ equals the sum of the signals representative of said upper limit of said range of each source whereby there is produced an operation pursuant to the following equation where the desired generation of a source equals $$Ya_2-\frac{[(Ya_2+Yb_2+Yc_2+\ldots+Yn_2)-(-E_{in})](Ya_2-Ya_1)}{(Ya_2+Yb_2+Yc_2 \ldots +Yn_2)-(Ya_1+Yb_1+Yc_1 \ldots Yn_1)}$$

No references cited.

UNITED STATES PATENT OFFICE
CERTIFICATE OF CORRECTION

Patent No. 3,071,693                      January 1, 1963

Frederick Beam Davis, 3rd

It is hereby certified that error appears in the above numbered patent requiring correction and that the said Letters Patent should read as corrected below.

Column 9, line 70, for "$Y'n_{(m+1)}$" read -- $Y'n_{(m+1)}$ -- --.

Signed and sealed this 3rd day of December 1963.

(SEAL)
Attest:
ERNEST W. SWIDER

EDWIN L. REYNOLDS

Attesting Officer

Acting Commissioner of Patents